United States Patent [19]

Bexten et al.

[11] Patent Number: 4,674,578
[45] Date of Patent: Jun. 23, 1987

[54] FLOATING MARKER ARM MECHANISM

[75] Inventors: Eugen Bexten, Ancaster, Canada; John F. Stufflebeam, Romeoville, Ill.

[73] Assignee: J. I. Case Company, Racine, Wis.

[21] Appl. No.: 817,455

[22] Filed: Jan. 9, 1986

[51] Int. Cl.4 ............................................. A01B 69/02
[52] U.S. Cl. .................................... 172/126; 172/456
[58] Field of Search .............................. 172/126-132, 172/311, 456

[56] References Cited

U.S. PATENT DOCUMENTS

| | | | |
|---|---|---|---|
| 1,917,733 | 7/1933 | Psikal | 172/126 |
| 2,175,282 | 10/1939 | Cormany | 172/126 |
| 2,602,684 | 7/1952 | Pinke | 172/126 |
| 3,158,204 | 11/1964 | Martin | 172/126 |
| 3,428,134 | 2/1969 | Bauman | 172/130 |
| 3,450,210 | 6/1969 | Smith | 172/130 |
| 3,503,451 | 3/1970 | Eastman | 172/132 |
| 3,511,316 | 5/1970 | Oerman | 172/126 |
| 3,512,588 | 5/1970 | Cagle | 172/130 |
| 3,520,373 | 7/1970 | Stinemetz | 172/130 |
| 3,524,508 | 8/1970 | West | 172/126 |
| 3,529,672 | 9/1970 | Smith | 172/123 |
| 3,537,533 | 11/1970 | Morehouse | 172/130 |
| 3,540,102 | 7/1970 | Krumholz | 172/128 |
| 3,556,226 | 1/1971 | Brewer | 172/130 |
| 3,575,242 | 4/1971 | Olsson | 172/130 |
| 3,580,340 | 5/1971 | Brown | 172/126 |
| 3,587,750 | 6/1971 | Cantral | 172/130 |
| 3,627,057 | 12/1971 | Hartwig | 172/126 |
| 3,669,195 | 6/1972 | Green | 172/126 X |
| 3,670,823 | 6/1972 | Mathews | 172/128 |
| 3,677,348 | 7/1972 | Boetta | 172/130 |
| 3,714,991 | 2/1973 | Rieser | 172/130 |
| 3,736,990 | 6/1973 | Rogers | 172/131 |
| 3,766,987 | 10/1973 | Orthman | 172/126 |
| 3,774,691 | 11/1973 | Oak | 172/130 |
| 3,799,272 | 3/1974 | Watson | 172/126 |
| 3,833,066 | 9/1974 | Hitt | 172/131 |
| 3,903,970 | 9/1975 | Grataloup | 172/126 |
| 3,948,326 | 4/1976 | Harbert | 172/130 |
| 3,955,627 | 5/1976 | Brown | 172/130 |
| 4,030,551 | 6/1977 | Boetto | 172/126 |
| 4,063,597 | 12/1977 | Day | 172/126 |
| 4,067,394 | 1/1978 | Deckler | 172/130 |
| 4,207,950 | 6/1980 | Kinzenbaw | 172/126 |
| 4,360,066 | 11/1982 | Mann | 172/130 |
| 4,365,672 | 12/1982 | Robinson | 172/130 X |
| 4,449,590 | 6/1984 | Williamson | 172/126 |
| 4,467,872 | 8/1984 | Hoalapp | 172/126 |
| 4,520,875 | 6/1985 | Deckler | 172/126 |
| 4,526,235 | 7/1985 | Kinzenbaw | 172/126 |
| 4,526,236 | 7/1985 | Jacobsen | 172/126 |
| 4,530,405 | 7/1985 | White | 172/126 |

Primary Examiner—Richard J. Johnson
Attorney, Agent, or Firm—Dressler, Goldsmith, Shore, Sutker & Milnamow, Ltd.

[57] ABSTRACT

A floating marker arm mechanism is disclosed. The marker arm mechanism comprises a bifolded marker arm pivotably mounted on a wheeled farm implement. The marker arm comprises first and second elongated members, pivotally connected together. The marker arm folds and is generally vertically disposed when not in use. When in use, the marker arm is extended outwardly from the wheeled implement and downwardly toward the ground. The marker arm mechanism of the present invention further includes a pivotable bracket removably affixed to the wheeled implement. The marker arm is pivotally mounted on the bracket. The bracket permits the arm to "float" between upper and lower positions when extended outwardly toward the ground to permit a marker disc mounted on the free end of the arm to follow ground contours if any.

3 Claims, 5 Drawing Figures

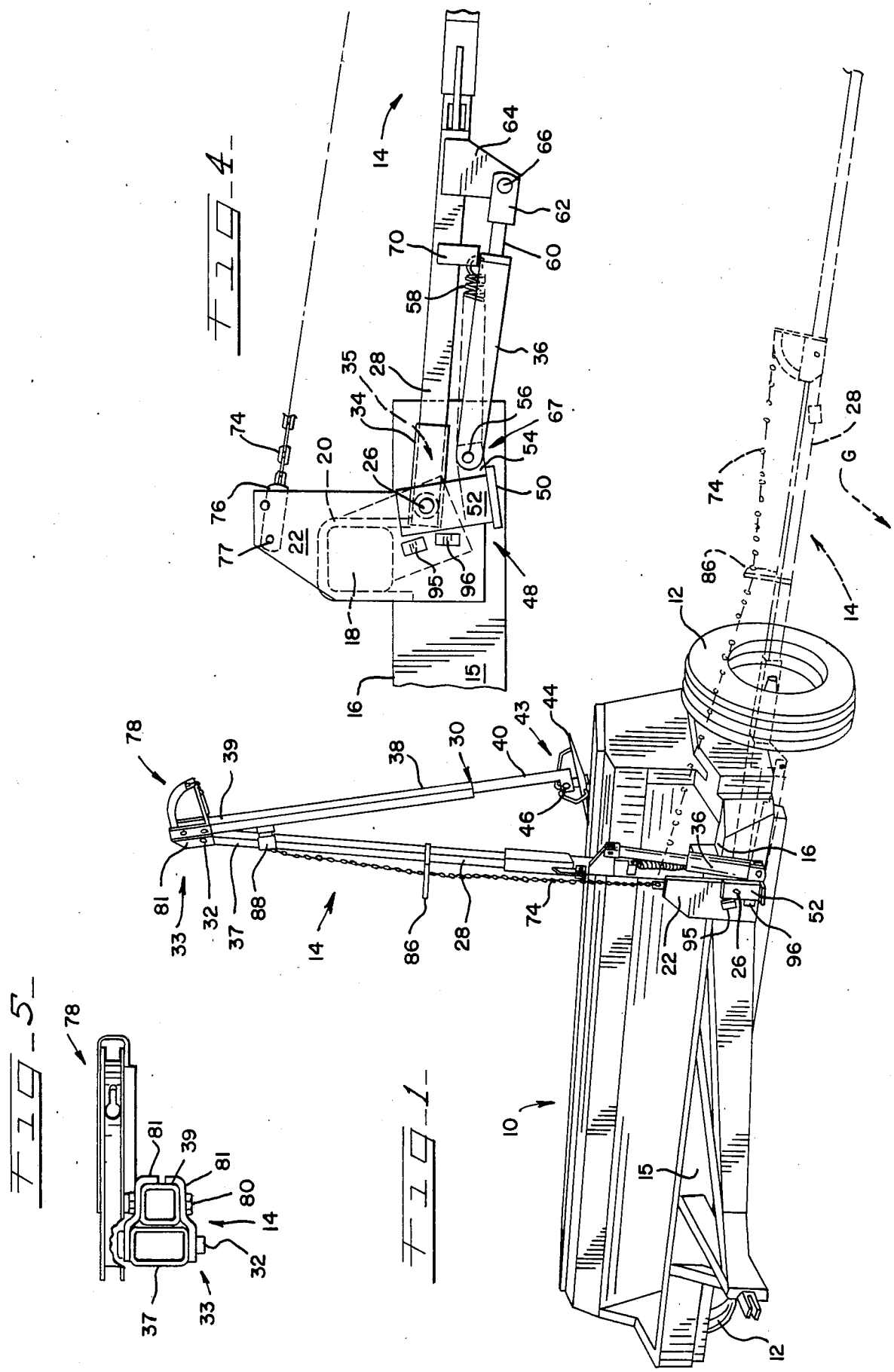

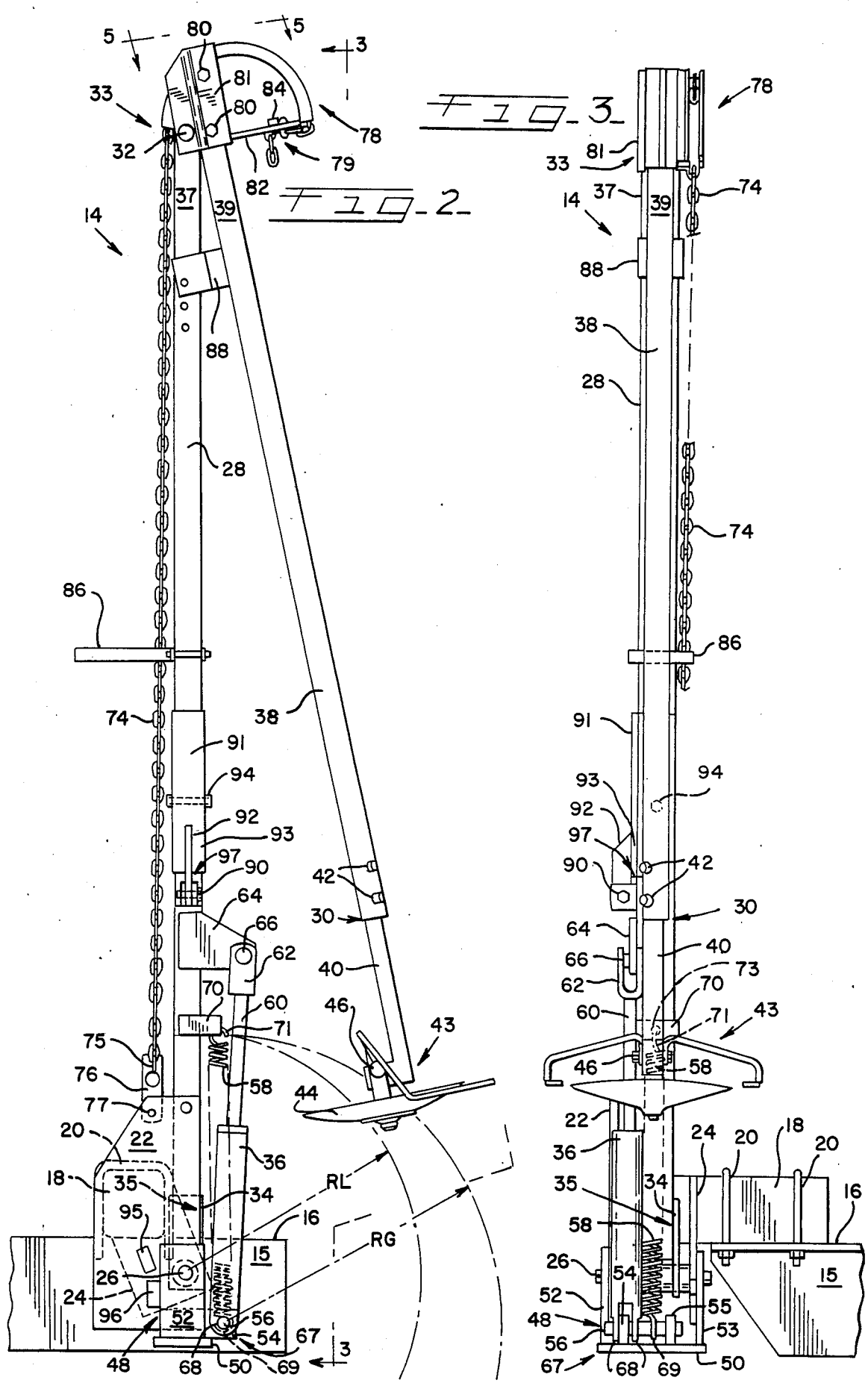

4,674,578

FLOATING MARKER ARM MECHANISM

TECHNICAL FIELD OF THE INVENTION

The present invention is directed to a marker arm mechanism used for forming a marker furrow in a field. More particularly, the present invention is directed to a marker-arm mechanism which permits the disc portion of a marker arm generally to follow ground contours present in a field. That is, the marker-arm mechanism permits the marker arm to "float" above the ground, between upper and lower positions, as the disc follows the ground surface elevations and depressions when forming the marker furrow.

BACKGROUND OF THE INVENTION

Marker arms are used for forming marker furrows. The marker-arm mechanism includes an elongated marker arm and a marker disc, attached to the marker arm, for forming the marker furrow. A first end portion of the marker arm is mounted on a wheeled farm implement. The opposite end portion of the marker arm has the disc affixed thereto.

A tractor is used to pull the wheeled farm implement through the field. The marker arm mechanism includes means for causing the disc to penetrate the soil; and the marker arm, being moved over the ground by the tractor, causes the soil-penetrating disc to be dragged across the soil in a soil-penetrating manner, thereby forming a linear "marker" furrow. For the marker arm, this is referred to as the "working position."

Wheeled farm implements, in addition to carrying one or two marker-arm mechanisms, generally also carry a plurality of ground-tool implements. For example, one conventional ground-tool implement is a so-called "row unit" which includes a disc and a press-wheel assembly. The row-unit disc opens a furrow in the soil, another device on the farm implement deposits seeds at appropriate spaced intervals in the row-unit furrow, and the press wheel loosely covers the seeds with moist soil. Conventional tractors pull wheeled farm implements having 42-56 row units attached. Row planters of this sort are thus used to form a plurality of parallel-spaced seed-implanted furrows as the tractor operator makes a pass through the field. Accordingly, a single pass of seed-implanted furrows of a row planter can be quite wide.

The object of using a marker arm, to form a marker furrow, is to space consecutive passes as close to each other as possible without overlap and without permitting unworked areas of the field to form between furrows formed by successive passes of the row units through the field. Overlap, for example, tends to waste seed, which can be costly to the farmer; and unworked areas reduce the farmer's yield-to-acre ratios, which is similarly undesirable. After completing a pass and turning his tractor around to form a subsequent pass, a tractor operator will generally center his tractor on the just-formed marker furrow, to guide him as he forms the subsequent pass.

Conventional markers are somewhat fragile, being perhaps 3 to 4 inches across in transverse cross section and 20 to 25 feet in length. Because of length considerations, most commercial marker arms are constructed of pivoted, bifolded members. Until use is required, the conventional marker arm is typically folded and disposed generally vertically relative to the ground. This is referred to as the "transport position" for the marker arm.

It is desirable that a marker disc be able to follow most ground contours, when the field is not level, so as to provide the tractor operator with a somewhat continuous marker furrow for lining up his tractor on his next pass. The problem with the way most conventional marker arms are mounted to wheeled implements, however, is that little or no design consideration is given to freedom of movement of the marker arm, independent of the surface-following movement of the farm implement. That is, the disposition of conventional marker arms toward the ground, because the marker arms are mounted onto the wheeled implement, is governed to a major extent by the way the wheeled implement follows the ground contours. However, for reasons discussed above, the marker disc is spaced a considerable distance from the wheeled implement; and, as a result, ground contours influencing attitude of the wheeled implement relative to the horizontal may be quite different, in elevation or depression, from the ground contours to which the marker disc is being exposed. One disadvantage of such marker arm design is that significant damage can be caused when marker arm movement becomes restrained by a hill or when a marker arm is snagged by rocks, trees, fence posts or other obstacles during field and transport operation. It is desirable, therefore, to permit the marker disc to follow ground contours, substantially independent of the influence of the wheeled farm implement.

Movement of the marker arm from the transport to the field position is typically caused by a hydraulic cylinder mechanism powered by the tractor. Such conventional hydraulic mechanisms typically include double-acting hydraulic cylinders which require two pairs of hydraulic fluid lines. That is, a first set of hydraulic fluid lines is required to actuate the hydraulic cylinder piston rod to extend or retract to dispose the marker arm outwardly into the field position; and a second set of hydraulic lines is required to return the marker arm to the transport position. Typically, the tractor generates the power required to pump hydraulic fluid, which actuates the double-acting hydraulic cylinder, for extending and retracting the marker arm. It is desirable to make more efficient use of tractor power during raising and lowering of the marker arm.

SUMMARY OF THE INVENTION

The marker arm of the present invention comprises a bifolded arm pivotally mountable on a wheeled farm implement. The arm comprises a forearm and an upperarm. The forearm and upperarm are pivotally connected at an elbow located therebetween. The forearm and upperarm fold, and are spaced adjacently and disposed vertically, when the marker arm is in the transport position. The marker arm further includes a marker disc pivotally mounted to the forearm wrist portion, opposite the elbow portion, for forming a marker furrow. The marker arm mechanism comprises a pivotable bracket, carried by the farm implement. The marker arm is pivotally mounted on the bracket. The bracket permits the marker arm to "float" between upper and lower positions, when extended outwardly from the wheeled implement and disposed somewhat downwardly toward the field, to permit the marker disc to follow the ground contours independent of the farm implement. The floating marker arm design of the present invention incorporates a tension spring which co-acts with a single-acting hydraulic cylinder for extending and retracting the marker arm. Such use of a single-acting hydraulic cylinder thus reduces the number of hydraulic lines required and, more importantly, reduces the total amount of power required to raise and lower the marker arm, as described above. The marker arm mechanism of the present invention also includes a breakaway or "shear pin" feature which permits a snagged marker arm to pivot through an arc of as much as ninety degrees, to permit the snagged arm to be released from the snagging obstruction. This breakaway feature tends to reduce and even eliminate damage to the snagged arm. The breakaway feature permits the snagged marker arm to fold at a pivoted hinge joint. The breakaway feature thus gives rise to an additional height-reduction feature which permits a tractor operator to reduce the height of a vertically-raised marker arm by approximately two-thirds, if desired.

BRIEF DESCRIPTION OF THE DRAWINGS

FIG. 1 is an isometric view of a bifolded marker arm mounted on a wheeled farm implement, a substantial portion of the marker arm being shown disposed toward the ground in phantom;

FIG. 2 is a front view, on an enlarged scale relative to FIG. 1, illustrating the floating marker arm mechanism of the present invention;

FIG. 3 is a side view, taken generally along the plane 3—3 in FIG. 2;

FIG. 4 is a fragmented front view, on an enlarged scale relative to FIG. 1, illustrating the spaced relationships of some of the co-acting elements of the floating marker arm mechanism of the present invention, the marker arm having been disposed downwardly from the wheeled farm implement toward the ground; and FIG. 5 is a view taken along the plane 5—5 in FIG. 2.

DETAILED DESCRIPTION OF PREFERRED EMBODIMENT

While the present invention is susceptible to embodiment in various forms, there is shown in the drawings and hereinafter described in detail a presently preferred embodiment of the invention, with the understanding that the present disclosure is to be considered as an exemplification of the invention without limitation to the specific embodiment illustrated.

Referring initially to FIG. 1, there is shown a farm implement 10 mounted on spaced wheels 12. The wheels 12 support the weight of the farm implement on the ground G. The preferred embodiment of the marker arm mechanism of the present invention is shown mounted on the forward left corner portion of the wheeled farm implement 10.

Most farm implements, carrying marker arms, generally carry a pair. One marker arm, for example, is generally mounted on the left side and a second on the right side, of the farm implement. This is so that a tractor operator, upon completing a pass using one marker arm, can make a U-turn to make a subsequent pass. While making the subsequent pass, the other marker arm is used. Thus, on conventional farm equipment, the markers are alternated between the field and transport position whereby one of the two marker arms is always in the field position. The marker arm mechanism of the present invention can function equally well whether mounted on the left or right corner portions of a wheeled farm implement, and can function just as well whether mounted on the forward end or the trailing end of the implement. In the illustrated embodiment, the marker arm mechanism is shown mounted to a forward frame 15 of the farm implement 10. The frame 15 has a substantially horizontal ledge 16. The marker arm mechanism of the present invention is releasably affixed to the frame 15 as follows.

Referring initially to FIG. 3, a stubbed base 18 is shown removably affixed to the frame 15, on the ledge 16, by box-ended U-shaped threaded fasteners such as U bolts 20. The U bolts 20 permit the base 18 to be slidably adjustable along the ledge 16 in the forward and rearward direction relative to the wheeled implement 10. Further, the U bolts 20 permit the marker arm mechanism to be removed from the wheeled implement 10 if desired.

A first mounting plate 22 is shown in FIG. 3 as fixed to an end of the base 18. A second mounting plate 24, parallel-spaced from the first mounting plate 22, is also fixed to the base 18. As shown in phantom in FIG. 2, the second mounting plate 24 depends somewhat acutely but generally downwardly from the base 18. The first and second mounting plates 22 and 24 each include a through bore for carrying a pivot pin 26. The pin 26 is spaced somewhat to the side of and beneath the base 18, which spacing can be seen by referring to FIG. 2. The marker arm 14 is carried by the first and second mounting plates 22 and 24, and is rotatably mounted on the pivot pin 26.

Referring now to FIGS. 1 and 2, it can be seen that the marker arm 14 includes an upperarm 28 and a pivotally connected forearm 30. When the marker arm 14 is in the transport position (as shown in FIGS. 1-3), the upperarm 28 is disposed substantially vertically relative to the ground G; and the forearm 30, connected to the upperarm 28 by a pivot pin 32 mounted on the upperarm elbow 33, is acutely downwardly disposed toward the ground G at the elbow 33 of the upperarm 28 as is shown in FIG. 2.

The lower end portion 35 of the upperarm 28 has a pair of parallel-spaced mounting plates 34 fixed thereto for rotatably mounting the upperarm 28 on the pivot pin 26. One plate 34 is shown in FIG. 3; the other plate 34, being in the background in FIG. 3, is behind a hydraulic cylinder 36 which will be discussed in greater detail, below. Each mounting plate 34 includes a through bore through which the pivot pin 26 is disposed.

The upperarm 28 is pivotable about the pin 26 from a substantially vertical to a substantially horizontal position relative to the ground G as is shown in FIG. 1.

The elbow-mounted pivot pin 32, carried by the upperarm-end portion 37 of the marker arm 14, has the forearm-end portion 39 of the marker arm 14 rotatably mounted thereon. Side brackets 81, described below, are fastened to the forearm-end portion 39 and are mounted on the pivot pin 32, thereby permitting the marker arm 14 to fold at the elbow 33 or to straighten. See FIGS. 1-3 and 5. The marker arm 14 thus is bifolded to reduce the overall height of the marker arm 14 when in the transport position. In accordance with the purpose of marker arms, outlined above, the illustrated marker arm 14 is designed to reach a substantial distance outwardly from the farm implement 10 when in the field position, as shown in phantom line in FIG. 1, when desired.

The illustrated marker arm 14, however, further includes a length-adjustment feature which will now briefly be described. The forearm 30 comprises an elongated hollow member 38, substantially square in transverse cross section as can be seen by referring to the forearm-end portion 39 shown in FIG. 5. An elongated tubular member 40, circular in cross section (detail not shown), is slidingly disposed into the elongated hollow member 38. A pair of adjustment screws 42, for removably fixing tubular member 40 to hollow-square member 38, permit the tubular member 40 to be longitudinally extended from or retracted within the hollow member 38, relative to the elbow 33, for lengthening or shortening the length of the forearm 30, as desired.

The wrist end 43 of the forearm 30 has mounted thereon a marker disc 44. The marker disc 44 is removably mounted on the wrist end 43 by a wrist bolt 46. The bolt 46 is releasably tightenable for adjusting orientation of the disc 44 relative to the ground G, for forming vertically or acutely-disposed marker furrows as desired.

Referring back to FIGS. 2 and 3, the "float" feature of the present invention will now briefly be discussed. Depending from the base 18, and pivotally mounted on the pin 26, is a U-shaped bracket 48. The bracket 48 comprises a base plate 50 and a pair of parallel-spaced side plates 52 and 53 fixed to the base plate 50. Each side plate 52 and 53 includes a through bore for receiving the pin 26 therethrough. The first and second mounting plates 22 and 24 are disposed between the side plates 52 and 53 and are slideably engageable therewith. That is, as the bracket 48 pivots about pin 26, a surface portion of plate 52 slides across an associated surface portion of mounting plate 22, which it contacts. Similarly, plate 53 slidably engages mounting plate 24. See FIG. 3. A pair of horizontally-elongated parallel-spaced mounts 54 and 55 are fixed to the bracket base plate 50 between the first and second mounting plates 22 and 24. The mounts 54 and 55 each include a through bore for receiving a pivot pin 56 therethrough. The hydraulic cylinder 36 and a tension spring 58 are mounted on the pin 56, as described below.

The hydraulic cylinder 36 includes an extendable and retractable piston rod 60 having a clevis 62 fixed to the rod end-portion thereof. A mounting plate 64, fixed to the upperarm 28, is disposed between the forked ends of the clevis 62 (see FIG. 3); and the clevis 62 is pivotally fastened to the mounting plate 64 by a pivot pin 66. Cylinder end 67, opposite the clevis 62, includes a pair of integral parallel-spaced ears 68 which straddle mount 54. See FIG. 3. Each ear 68 includes a through bore for rotatably mounting the hydraulic cylinder 36 on pin 56. A lower end portion 69 of tension spring 58 (FIG. 3) is mounted on the pin 56 between the hydraulic cylinder ears 68 and the other mount 55. A second mounting plate 70 is fixed to the upperarm 28, beneath the first mounting plate 64, for causing the tension spring 58 to control rotation of the marker arm 14 about pin 26 in a manner described below in detail. The upper end portion 71 of tension spring 58 (FIG. 2) is looped through a through bore 73 (FIG. 3) formed through mounting plate 70.

Tension spring 58 co-acts with hydraulic cylinder 36 to provide the present invention with yet another feature, which will be mentioned only briefly in connection with the instant discussion concerning the "float" feature. The hydraulic cylinder 36 is a single-acting hydraulic cylinder. Extension of the piston rod 60 is caused by pumping hydraulic fluid into the hydraulic cylinder 36. As piston rod 60 extends, tension spring 58 is caused to lengthen and thus to store potential energy. When hydraulic fluid is released from the hydraulic cylinder 36, energy stored in the tension spring 58 is used to pivot the upperarm 28 about pin 26 from the substantially vertical disposition (FIG. 2) to the outward and downward disposition (FIGS. 1 and 4). Referring to FIG. 2, it can be seen that this pivoting action, caused by tension spring 58, occurs because as forearm 28 pivots about pin 26, the length of tension spring 58 decreases relative to pin 26. That is, when the upperarm 28 is vertically disposed, an arc scribed from the center of pin 56 has a greater radius $R_G$ than an arc scribed from the center of pin 26. The latter arc, scribed from pin 26, has a relatively lesser radius $R_L$, as is shown in FIG. 2. As the upperarm 28 pivots downwardly toward the ground G about the pin 26, the upper end 71 of tension spring 58 follows the arc scribed from the center of pin 26 along the lesser radius $R_L$ shown. More particularly, as the marker arm 14 pivots about pin 26, from the vertical to the outwardly and somewhat downwardly disposed position, the lesser radius $R_L$ is seen to spiral away (i.e. inwardly toward pin 26) from the greater radius $R_G$. This tends to amplify the combined effect of tension spring 58 co-acting with bracket 48, pivoting about pin 26, to accelerate downward motion of the upperarm 28 toward the ground G. This so-called "positive start-down motion" permits the tractor operator to rapidly cycle marker arms which in turn permits him to rapidly make a subsequent pass after making the U-turn mentioned above. Thus, because the tension spring 58 is relatively shorter when horizontally disposed than when vertically disposed, there is a tendency for tension spring 58 to draw upperarm 28 down from the vertically disposed position to the downwardly disposed position shown in phantom in FIG. 1. The tension spring 58, of course, must be suitably designed and be of a material capable of possessing sufficient stored energy to overcome the resistive and other forces imposed by the hydraulic cylinder 36, the bracket 48, the pin 26, and other elements of the marker arm mechanism herein disclosed.

A pair of stops 95 and 96, fixed to mounting plate 22, permit the outwardly and downwardly disposed marker arm 14 to float above the ground between lower and upper positions thereby permitting the marker disc 44 to follow the ground contours to form the marker furrow. The lowermost disposition of the marker arm 14 occurs when bracket side plate 52 abuttingly engages the lower stop 96 (see FIG. 4) and when piston rod 60 is fully retracted. However, when the marker disc 44 follows a surface elevation and thereby causes the marker arm 14 to elevate which in turn causes bracket side plate 52 to abuttingly engage upper stop 95, the marker arm 14 is still free to pivot about pin 26 to a limited degree. That is, depending upon the force required to extend piston rod 60, without the assistance of hydraulic fluid, a certain degree of upward freedom of movement can be achieved. Such freedom of movement, which may be preselectable, is of course a design characteristic of hydraulic cylinders. For example, desired freedom of movement might be achieved by selecting a suitable hydraulic cylinder exhibiting minimal resistance to extension of its piston rod.

The location of the lower stop 96 on mounting plate 22 serves an additional purpose. When the hydraulic cylinder piston rod 60 is extending, bracket 48 is caused to rotate clockwise about pin 26 until the bracket side plate 52 biasly abuttingly engages stop 96, as a result of the rod-extending action of the hydraulic cylinder 36 (FIG. 2). That is, stop 96 has been so located on mounting plate 22 that such biased engagement results in upperarm 28 being disposed substantially vertically relative to the ground G when in the transport positon (FIG. 1). Substantially vertical is the preferred position of the bifolded marker arm 14, as this allows close seeding to hedgerows and fence lines. Further, the tucked-in disposition of the arm 14 when in the transport position (FIGS. 1 and 2) provides desired clearance between the marker disc 44 and aforementioned row units (not shown) which are spaced beneath the frame 15 (FIG. 2). The location of the stops 95 and 96 thus permits partial rotation of bracket 48 about pin 26; and further, permits the extended marker arm 14 to move somewhat freely, between upper and lower positions, along an arc scribed from the center of pin 26. In other words, stops 95 and 96 have been selectively located on mounting plate 22, so as to be radially spaced from pin 26 with the stops-contacting edge-portion of bracket side plate 52 being spaced between the pin 26 and the stops 95 and 96, to achieve the above-discussed effects. Of course, location of stops 95 and 96 is not critical to the invention disclosed herein; rather, the location of stops 95 and 96 is a design detail, readily alterable by those skilled in the art, for accordingly altering the above discussed effects as desired.

The elements of the present invention which co-act to cause the forearm 30 to pivot about pin 32 to cause the marker arm 14 to fold at the elbow 33, will now briefly be discussed. A chain 74 is fixed at one end link 75 (FIG. 2) thereof to the mounting plate 22 by a chain connector 76 pivotally mounted on the mounting plate 22 by a pivot pin 77. The other end link 79 (FIG. 2) is connected to a chain guide 78 as follows. The chain guide 78 has the marker-arm forearm-end portion 39, adjacent the elbow 33, fastened thereto and the guide 78 is rotatably mounted on the pin 32, as is shown in FIGS. 3 and 5. That is, the upper end of forearm 30 is fixed to the chain guide 78, and the chain guide 78 is rotatable about pivot pin 32. The forearm-end portion 39 is fixed to the guide 78 by threaded fasteners 80 and a pair of parallel-spaced side brackets 81. With the brackets 81 straddling the marker arm end portions 37 and 39 (FIG. 5), the threaded fasteners 80 are used to fasten the forearm-end portion 39 to the chain guide 78 at the elbow 33. Thus, the chain guide 78 and the forearm 30 fastened thereto are rotatable at the elbow 33 about pivot pin 32.

The guide 78 is spiral shaped relative to the pivot pin 32 (FIG. 2) and is U-shaped in radial transverse cross-section (FIG. 5) for carrying links of the chain 74 in the U thereof, as is shown in FIG. 3. End link 79 of the chain 74 is adjustably fastened to the chain guide 78 at spacer bar 82. Spacer bar 82 is fixed to the forearm-end portion 39 of the marker arm 14, and the spacer bar 82 is also fixed to an end portion of the chain guide 78. The chain-guide end portion is in distal relation to pivot pin 32 (FIG. 2). The spacer bar 82 includes a slot (not shown) for disposing chain links therethrough. Mounted on spacer bar 82 is a pin 84 for releasably fastening chain links to the spacer bar 82, to increase or decrease chain length as desired.

The process whereby the chain 74 causes the marker arm 14 to straighten will briefly be discussed below. Because chain 74 becomes spaced from the marker arm 14 when the upperarm 28 and forearm 30 are substantially co-linearly disposed, as is shown in phantom in FIG. 1, a chain guide 86 is mounted on the upperarm 28 for keeping the chain 74 relatively close to the marker arm 14 to minimize the likelihood that the chain 74 will become entangled in an obstruction. Such an obstruction, for example, might interfere with the folding operation of the arm 14 or might result in damage to the arm 14.

When the upperarm 28 is vertically disposed, as shown in FIG. 2, a significant portion of the chain 74 is also disposed substantially vertically relative to the ground G and is located very close to the upperarm 28. Stating this another way, a substantial portion of the chain 74, shown as being essentially linear in FIG. 2, extends from pin 32 downwardly to chain connector 76, which is spaced radially from (i.e. above) pin 26, which results in the aforementioned chain length being less than the length of upperarm 28 between pins 26 and 32. However, when the marker arm 14 is caused to be disposed downwardly, as is shown in phantom in FIG. 1, the upperarm 28 is accordingly caused to pivot about pin 26. As can be appreciated by referring to FIG. 4, the aforementioned substantially-linear portion of the chain 74 (i.e. between pin 32 and chain connector 76) is increased significantly (over the linear chain-length portion discussed in connection with FIG. 2). As a result, the downward motion of the marker arm 14 causes chain 74 to pull on spacer bar 82. The pulling action of chain 74 on spacer bar 82 in turn causes the guide 78 to pivot about the pivot pin 32 resulting in the substantially co-linear disposition of the forearm 30 relative to the upperarm 28, mentioned above. Similarly, when hydraulic fluid, pumped into hydraulic cylinder 36, causes the piston rod 60 to extend, the pulling force being imposed upon chain 74 is relaxed; and the weight of forearm 30 causes the forearm 30 to pivot about the elbow-mounted pivot pin 32 as the forearm 30 of marker arm 14 is raised from the field position to the transport position (FIG. 1).

To avoid shock impact, which would otherwise be caused by forearm 30 abruptly contacting upperarm 28 as the forearm 30 is being raised thusly, the upperarm 28 is provided with a rubber pad 88 mounted on the upperarm 28 adjacent the pivot pin 32 and disposed outwardly from the upperarm 28 in the direction of the forearm 30. See FIGS. 1–3.

The marker arm mechanism of the present invention also includes a "shear" or breakaway feature to minimize damage to the marker arm 14 when an obstacle is encountered in the field. For example, such obstacles can include, in addition to the above-discussed obstructions resulting in the snagging of the chain 74, other obstructions resulting in the snagging of the marker arm 14 itself or the snagging of the marker disc 44 on rocks, trees, fence posts and the like during field and/or transport operation. Briefly, the upperarm 28 carries a shear pin 90 (FIGS. 2 and 3) which shears when shearing plate 92, fixed to the upperarm 28, imposes a predetermined shearing force on the shank portion of shear pin 90. When pin 90 shears, respective upper and lower integral portions 91 and 93 of a sleeve mounted on the upperarm 28 pivot about hinge pin 94 to minimize damage to the marker arm 14 and/or the marker disc 44. The upper and lower portions 91 and 93 of the sleeve, adjacent the hinge pin 94, are preferably welded to the upperarm 28 in a manner so as to permit the upperarm 28 to fold at the hinge pin 94. The shearing plate 92 is fastened to the lower portion 93. The hinge pin 94 thus permits the upperarm 28 to fold at hinge pin 94 when the shear pin 90 is sheared. When the upperarm 28 is folded in such manner, the lower edge 97 of lower portion 93 of the sleeve pivots about hinge pin 94 away from shear pin 90. In other words, referring to FIG. 3, as the marker arm 14 is transported across a field in either the field or transport position, the marker arm 14 (as shown in FIG. 3) is typically moved from right to left. After pin 90 shears, the portion of upperarm 28 spaced in distal relation to base 18 (i.e. above hinge pin 94) is caused by the obstruction to pivot clockwise as much as 90 degrees, about pin 94, to minimize damage to the marker arm 14 and/or marker disc 44. When the pivoting portion of the upperarm 28 swings a full 90 degrees, the height of the upwardly-disposed bifolded marker arm 14 (see FIG. 1) is reduced by about two-thirds.

Further, the shear pin 90 is readily removable, from the upperarm 28, by the tractor operator. This provides an added advantage for storage in machine sheds and the like.

What has been illustrated and described herein is a novel marker-arm mechanism. While the marker-arm mechanism of the present invention has been illustrated and described with reference to a preferred embodiment, the present invention is not limited thereto. On the contrary, alternatives, such as mechanical or structural equivalents, and other changes or modifications, may become apparent to those skilled in the art upon reading the foregoing description. Accordingly, such alternatives, changes and modifications are to be considered as forming a part of the invention insofar as they fall within the spirit and scope of the appended claims.

We claim:

1. A marker-arm mechanism mountable on a wheeled implement having a frame for forming a marker furrow in the ground, the marker-arm mechanism comprising:
   a base adjustably and removably mounted on the frame;
   a marker-disc means for forming the marker furrow;
   foldable marker-arm means having an upper arm rotatably mounted at one end thereof on a pivot carried by the frame and having a forearm carrying the mark-disc means pivotally connected to the other end of the upper arm, for extending the marker-disc means away from the wheeled implement;
   actuation means carried by the upper arm and the base comprising:
   a second pivot carried by the base and spaced from the first pivot;
   hydraulic cylinder means mounted on the marker-arm means and the second pivot for causing the marker-arm means to retract the marker-disc means from the ground and to draw the marker-disc means inwardly toward the wheeled implement;
   means for mounting the upper arm to the base to allow for rotative movement of the marker-arm means between first and second positions relative to the pivot; and
   spring means mounted between the upper arm of the marker-arm means and the second pivot for causing the marker-arm means to extend the marker-disc means away from the wheeled implement and to contact the ground for forming the marker furrow.

2. A marker-arm mechanism mountable on a wheeled implement having a frame for forming a marker furrow in the ground, the marker-arm mechanism comprising:
   marker-disc means for forming the marker furrow;
   foldable marker-arm means having an upper arm rotatably mounted at one end thereof on a pivot carried by the frame and having a forearm carrying the marker-disc means pivotally connected to the other end of the upper arm, for extending the marker-disc means away from the wheeled implement;
   means for adjustably and removably mounting a base to the frame comprising means carrying a second pivot on the first pivot; and
   actuation means carried by the upper arm and the base for causing the marker-arm means to extend the marker-disc means away from the implement and to contact the ground for forming the marker furrow and for causing the marker-arm means to retract the marker-disc means from the ground and to draw the marker-disc means inwardly toward the implement; and
   means for mounting the upper arm to the base including stop means carried by the base and abuttingly engageable by the pivot mounting means to allow for rotative movement of the marker-arm means between first and second positions relative to the pivot and resiliently urging the marker-disc means substantially to follow ground-surface contours for forming the marker furrow.

3. A marker-arm mechanism mountable on a wheeled implement having a frame for forming a marker furrow in the ground, the marker-arm mechanism comprising:
   a base adjustably and removably mounted on the frame;
   a marker-disc means for forming the marker furrow;
   foldable marker-arm means having an upper arm rotatably mounted at one end thereof on a pivot carried by the frame and having a forearm carrying the marker-disc means pivotally connected to the other end of the upper arm for extending the marker-disc means away from the wheel implement;
   actuation means carried by the upper arm and the base for causing the marker-arm means to extend the marker-disc means away from the implement and to contact the ground for forming the marker furrow and for causing the marker-arm means to retract the marker-disc means from the ground and to draw the marker-disc means inwardly toward the implement;
   means carried by the base and mounted on the marker-arm means for causing the marker-arm means to fold when retracting the marker-disc means from the ground and for causing the marker-arm means to straighten when extending the marker-disc means away from the wheeled implement; means mounted on the upper arm for preventing shock contact by the forearm;
   means for mounting the upper arm to the base to allow for rotative movement of the marker-arm means between first and second positions relative to the pivot and resiliently urging the marker-disc means substantially to follow ground-surface contours for forming the marker furrow, and
   shearable means including a shear pin and a foldable hinge joint both mounted on the upper arm, to allow the upper arm to fold along the hinge joint when lateral movement of the marker-arm means relative to the ground is restrained by a predetermined force.

* * * * *